United States Patent Office 3,726,812
Patented Apr. 10, 1973

3,726,812
ACRYLAMIDE TYPE EARTH RESISTANCE REDUCING AGENT AND METHOD OF USE THEREOF
Einosuke Higashimura, Tokyo, Keiichi Hirai and Eisaku Okamoto, Yokohama, Masami Sasaki, Kawasaki, Yukihiko Sekimoto, Iruma, and Akiyoshi Horiba, Tokyo, Japan, assignors to Nitto Chemical Industry Co., Ltd., and Mitsubishi Rayon Co., Ltd., both of Tokyo, Japan
No Drawing. Filed May 25, 1971, Ser. No. 146,828
Claims priority, application Japan, May 29, 1970, 45/46,252; June 22, 1970, 45/54,230, 45/54,231
Int. Cl. H01b 1/06
U.S. Cl. 252—521    19 Claims

ABSTRACT OF THE DISCLOSURE

An acrylamide type earth resistance-reducing agent comprising (1) acrylamide, (2) a water-soluble crosslinking monomer, (3) sodium acrylate and/or ammonium acrylate, and (4) at least one compound selected from the group consisting of metal salts of methacrylic acid, ammonium methacrylate, and 2-hydroxyethyl methacrylate. Corrosion resistance of the earth electrode is improved by adding to the said reducing agent at least one compound selected from the group consisting of water-soluble thiocyanates, benzotriazole, and hydroxy- halogen-, alkyl-, or nitro-substituted derivatives of benzotriazole. If necessary, the earth resistance can be further reduced advantageously by addition of an inorganic electrolyte to the said reducing agent. The above-said compositions are applied in the form of an aqueous solution and together with a redox catalyst by pouring or injecting into the soil surrounding the earth electrode.

---

This invention relates to chemical treatments to reduce the resistance of ground connections.

Electrical installations are provided with earthing device for safety. However, there are many regions where the soil offers difficulty in maintaining the earth resistance specified in the Technical Standards for Electrical Installations. For example, it is quite difficult to maintain the specified earth resistance in gravel bed, pebble bed, rocky land, lapilli region, volcanic ash soil, or lava region. Further, in recent years, in order to improve the efficiency of transmission and distribution of power, an extra-high voltage transmission and distribution has been adopted, which requires still lower earth resistance even in a lay loam.

As a means for reducing the earth resistance, a chemical treatment method has been known for some time. According to said method, an inorganic electrolyte, such as sodium chloride, magnesium sulfate, copper sulfate, magnesium chloride, calcium chloride, ammonium chloride, or the like, is injected into the soil surrounding the electrode. When this method is applied, the soil shows most favorable earth resistance for some period immediately succeeding the moment of treatment. However, the chemicals are carried away by surface runoff water and inter flow water during rainfall, and the effect of chemicals lasts only for a period ranging from several months in an extreme case to three years at the longest, the mean effective period being about two years. Accordingly, the chemical treatment must be repeated after a certain period, but such repeated treatments, maintenance, and inspection are extremely difficult to be performed in remote and deserted places.

In order to improve the inferior durability of the earth resistance-reducing effect, there are used recently retentive materials for the above-said inorganic electrolytes, such as silica gel and resins of the lignin type or urea type. Also, earth resistance-reducing agents of the acrylamide type have been introduced for the same purpose. The said earth resistance-reducing agent of the acrylamide type generally comprises acrylamide, a crosslinking agent, and a water-soluble electrolytic salt. This agent has a considerably improved effective life, but has such a defect that as the soil dries the internal strain of the gel, which has been formed from said agent, tends to increase and the gel begins to shrink resulting in formation of cracks. When the formation of such cracks once started, the earth resistance in the vicinity of the electrode such as earth rod or earth plate increases markedly owing to the void in the cracks. Moreover, loss of the electrolyte from the gel is increased owing to percolation through the cracks and it becomes difficult to maintain a long effective life.

An object of this invention is to provide an excellent earth resistance-reducing agent. Another object of the invention is to provide a method for maintaining an excellent earth resistance-reducing effect for a long period of time. A still another object of the invention is to keep the earth electrode from corrosion caused by the chemical treatment which is carried out to semi-permanently maintain the earth resistance-reducing effect. A further object of the invention is to impart to the soil surrounding the earth electrode an excellent strength, impermeability to water, and conductivity. A still further object of the invention is to prevent the formation of cracks in the soil surrounding the earth electrode when the soil is in a dry state, so that the fluctuation in earth resistance caused by the changes in climate and rainfall may substantially be obviated. A still another object of the invention is to provide a novel earth resistance-reducing agent, which may or may not contain an inorganic electrolyte, and a method for reducing the earth resistance by use of said agent.

The present inventors have conducted studies on semi-permanent retention of the earth resistance-reducing effect, and as a result, have accomplished the present invention.

According to this invention, there is provided an earth resistance-reducing agent of the acrylamide type comprising (1) acrylamide, (2) from 0.1 to 100% by weight, based on the weight of the acrylamide, of a water-soluble crosslinking monomer, (3) from 1 to 100% by weight, based on the weight of the acrylamide, of sodium acrylate and/or ammonium acrylate, and (4) from 1 to 500% by weight, based on the weight of the acrylamide, of at least one compound selected from the group consisting of metal salts of methacrylic acid, ammonium methacrylate, and 2-hydroxyethyl methacrylate, and there is further provided a method for reducing the resistance of soil in the vicinity of earth electrode, which is characterized by applying said earth resistance reducing agent in the form of an aqueous solution together with a redox catalyst to the soil surrounding the earth electrode to be hardened therein.

The earthing work for an electrical installation is frequently done in an out-of-the-way place or in a region of dry soil. In such cases where the durability of the earth resistance-reducing effect becomes a problem of great importance, said effect can be maintained for markedly longer period by treating the soil surrounding the earth electrode with the composition of this invention. This seems to be ascribable to the fact that the earth resistance-reducing agent according to this invention forms a gel having tackiness which develops scarcely any crack even when dried so that the earth electrode is always covered closely with a hardened gel of the acrylamide type and soil without allowing any gap to appear at the earthing interface. Accordingly, the excellent effect can be maintained for a long period.

As the water-soluble crosslinking monomers there may be enumerated, for example, N,N'-methylenebisacrylamide, N,N'-methylenebismethacrylamide, 1,3-di(acrylamidomethyl) - 2 - imidazolidone, 1,3 - di(methacrylamidomethyl) - 2 - imidazolidone, diacrylamidomethylethyleneurea, diacrylamidodimethyl ether, hexahydro- 1,3,5-triacyl-s-triazine, and polyvalent metal salts of acrylic acid. Sodium acrylate and ammonium acrylate, which are the third monomer, increase conductivity of the gel formed and prevent its shrinkage without interferring with uniform polymerization of other polymerizable monomers.

The fourth monomer, i.e. salts of methacrylic acid or 2-hydroxyethyl methacrylate, enables by addition thereof the earth resistance-reducing agent to polymerize uniformly to form a highly conductive gel having little inner strain, which has a high water retention and dries with difficulty. Moreover, the gel formed with the addition of the fourth monomer develops scarcely any crack when dried, and is restored to the original state by rainfall, so that gaps due to cracks will not appear, and hence, the earth resistance-reducing effect is maintained for a long time. These derivatives of methacrylic acid also show a distinguished effect for preventing the run-off of inorganic electrolytes which are to be added if necessary, and accordingly, are able to maintain an extremely low earth resistance for a long period.

As the metals of the salts of methacrylic acid, which are the fourth monomer, there may be used metals of Groups I and II of the Mendeleev Periodic Table, such as sodium, potassium, calcium, magnesium and the like.

Further, the present inventors have investigated the problem of corrosion of the earth electrode when the above-said chemical treatment process has been applied. The necessary conditions for the earth electrode are as follows:

(1) Electric resistance is low.
(2) Corrosion resistance is high (the electrode has high chemical resistance and little change in resistivity after being buried).
(3) Mechanical strength is high.
(4) Installation is easy.
(5) Price is low.

To meet these requirements, a copper-clad steel rod and copper-weld steel rod are frequently used in recent years. These electrodes are low in price, easy in installation, and resistant to corrosion. However, by application of the above-mentioned chemical treatment, corrosion is accelerated and, in addition to an increase in the earth resistance, the life of the electrode itself is subjected to a great influence. Therefore prevention of the electrode corrosion is very important for the chemical treatment which has a semi-permanent effect.

A number of corrosion inhibitors for copper have been known. Generally, organic nitrogen compounds, particularly heterocyclic compounds containing a —N— group, which is an easily adsorbable polar group, have been considered to be effective, and among these compounds a pyridine type and quinoline type are well known copper corrosion inhibitors. However, the corrosion inhibitors for use in this invention should be those which are soluble in water, inert to the polymerization (redox polymerization) of earth resistance-reducing agent, unsusceptible to the influence of curing catalysts, and are not influential upon the earth resistance. Therefore, compounds which do not meet the requirements are unsuitable for use as a corrosion inhibitor in this case, even if said compounds have a corrosion-inhibiting effect upon copper.

There are many compounds which exhibit a corrosion-inhibiting effect upon copper in an aqueous solution containing the earth resistance-reducing agent of the acrylamide type, whereas there are very few compounds which have substantially no effect upon the redox polymerization of said reducing agent and are capable of maintaining the corrosion-inhibitory effect in gel.

Examples of compounds, which are well known as corrosion inhibitors for copper and exhibit also an excellent corrosion-inhibitory effect in an aqueous solution of the earth resistance-reducing agent, include o-phenylenediamine, hexamethylenetetramine, lauryl mercaptan, mercaptobenzothiazole, mercaptobenzimidazole, β-mercaptopropionic acid, 2-mercaptoethanol, 1-phenyl-2-thiourea, thioglycolic acid, cetyl mercaptan, decyl mercaptan, hexyl mercaptan, butyl mercaptan, and potassium ferrocyanate. All of these compounds are, however, unsuitable for use in this invention because some of them prevent or markedly retard the gelation of the said reducing agents, some are insoluble in said reducing agents of the acrylamide type, and some lose to a considerable extent the corrosion-inhibiting effect in gel in case gelation takes place. Mercaptans are of no practical value because they are generally insoluble in water and difficultly dispersible and even if some of them are promising to some degree when dispersed in the presence of surface active agents, their strong odor is detrimental. Mercaptobenzimidazole is also hardly promising because it greatly retards the gelation with an increase in the added amount, and, moreover, it is insoluble in water.

The present inventors have found that in chemically treating the soil surrounding the earth electrode with an earth resistance-reducing agent of the acrylamide type, corrosion of the electrode can be inhibited without generating any adverse side effect by incorporating as one of the components 0.01–20% by weight, based on the weight of the earth resistance-reducing agent, of at least one compound selected from the group consisting of water-soluble thiocyanates, benzotriazole, and hydroxyl-, chloro-, lower alkyl($C_{1-4}$)- or nitro-derivatives of benzotriazole, into the earth resistance-reducing agent before use.

The water-soluble thiocyanates, benzotriazole, and hydroxyl-, chloro-, lower alkyl- or nitro-substituted derivatives for use in this invention are uniformly soluble in an aqueous solution of the earth resistance-reducing agent of the acrylamide type and exhibit a corrosion-inhibiting effect to a full extent not only in said solution but also in the gel formed, whilst influences upon the gelation reaction and earth resistance are negligibly small.

The thiocyanates for use in this invention include sodium thiocyanate, potassium thiocyanate, ammonium thiocyanate, etc. Among benzotriazole derivatives, there may be used in this invention 4-hydroxybenzotriazole, 5-nitrobenzotriazole, 6-nitrobenzotriazole, 5-chlorobenzotriazole, 6 - chlorobenzotriazole, 5 - methylbenzotriazole, 5-ethylbenzotriazole, 5-propylbenzotriazole, 4,5,6,7 - tetrahydrobenzotriazole, 5-methyl-4-hydroxybenzotriazole, etc.

The amount of acrylamide used in this invention is preferably such that about 1 to 30% by weight of acrylamide are present in the aqueous solution of earth resistance-reducing agent at the time of application thereof.

The water-soluble crosslinking monomer is present preferably in an amount of about 0.05 to 5% by weight in the aqueous solution of earth resistance-reducing agent at the time of application.

Sodium acrylate and/or ammonium acrylate are preferably present in an amount of about 0.05 to 30% by weight in the aqueous solution of earth resistance-reducing agent at the time of application.

Methacrylic acid derivatives and/or 2-hydroxyethyl methacrylate are present in an amount of 0.05 to 30% by weight, most preferably about 0.3 to 13% by weight, in the aqueous solution of said reducing agent at the time of application. When these compounds are added in an amount smaller than the lower limit given above, the results are sometimes unsatisfactory with respect to tackiness and internal strain of the gel formed, while the addition in an amount greater than the upper limit is uneconomical because the effect levels off beyond the upper limit.

When water-soluble salts of thiocyanic acid, benzotriazole, and derivatives thereof are incorporated as one of the components into the earth resistance-reducing agent to inhibit corrosion of the earth electrode, the amount to be incorporated is preferably such that about 0.001 to 10% by weight, more preferably 0.05 to 2% by weight of said compounds are present in the aqueous solution of said reducing agent at the time of application. When added in an amount smaller than the lower limit, these compounds will not exhibit an expected effect, while the addition in an amount greater than the upper limit is uneconomical because the effect levels off beyond the upper limit.

In the earth resistance-reducing agent according to this invention, there may be present, in addition to the above-mentioned compounds, N-methylolacrylamide, N-methylolmethacrylamide, acrylic acid, methacrylic acid, and acrylonitrile.

In applying the treatment procedure according to this invention, it is not necessary to use an inorganic electrolyte since a sufficiently low earth resistance may be obtained without using an inorganic electrolyte. However, in earthing operations for special purposes which require an earth resistance as low as below about 30 ohms, it is preferable to use as one of the components of the earth resistance-reducing agent an inorganic electrolyte such as sodium chloride, calcium chloride, potassium chloride, magnesium chloride, ammonium chloride, ammonium sulfate, copper sulfate, magnesium sulfate, iron sulfate, sodium nitrate, potassium nitrate, or the like. Such an electrolyte is used in an optional amount, but usually added to an aqueous solution of the earth resistance-reducing agent in an amount of about 0.5% by weight up to saturation.

As the redox catalyst, there may be used ordinarily known components which are water-soluble, including, for example, ammonium persulfate, potassium persulfate, sodium persulfate, and hydrogen peroxide as the oxidizing component; dimethylaminopropionitrile, sodium thiosulfate, and allylthiourea as the reducing component. The amount of these compounds to be used in the aqueous solution of earth resistance-reducing agent is 0.1 to 3% by weight, preferably 0.2 to 1% by weight.

In the present invention, an aqueous solution containing the earth resistance-reducing agent and a redox catalyst is poured in or injected into the soil surrounding the earth electrode in a suitable way. For example, an inverted cone-shaped or a cylindrical hole is dug out of the earthing ground, single or multiple earth rods are driven at the center of the hole, then a mixture of an aqueous solution A containing an earth resistance-reducing agent and the reducing component of a redox catalyst and an aqueous solution B containing the oxidizing component of the redox catalyst is poured into the hole, and finally the soil is replaced into the hole before hardening of the solution sets in. In this case, it is desirable to adjust the gelation time to the time necessary for the greater part of said aqueous solution to infiltrate into the immediate vicinity of the earth electrode. In another procedure of operation which may be adoptable, an earth rod is placed upright in a hole excavated by means of an auger, and then the above-said premixed solution is poured into the hole to cover completely the earth rod with a homogel of the earth resistance-reducing agent. Also adoptable is a method in which the said premixed solution is poured onto the ground surface of the earthing spot. The last-mentioned is a very simple method which utilizes the excellent infiltration ability of an aqueous solution of the earth resistance-reducing agent used in this invention, the viscosity of the solution being approximately the same as that of water.

In case an inorganic electrolyte is incorporated, it is preferably premixed with an aqueous solution containing the reducing component of the redox catalyst, or alternatively it can be added to an aqueous solution containing the oxidizing component, or it may be divided into two parts and added to both of the said aqueous solutions.

As the earth electrode, there may be suitably used a rod, plate, or wire mesh made of a conductive metal such as copper.

The earth electrode surroundings treated by the method of this invention are chemically stable, quite resistant to bacteria, acids and alkalis, and are able to maintain semi-permanently the earth resistance-reducing effect. The inorganic electrolyte, if present, will neither be carried off by rain water nor bleed by syneresis. The earth electrode can be protected from corrosion. Further, compared with the case where a conventional retentive material is used, not only the conductivity is superior but also no crack will be formed in dry state. Also, a fluctuation of the resistance due to seasonal changes of climate and rainfall is substantially negligible.

The invention is illustrated below with reference to Comparative Examples, Examples, and Reference Examples, in which all percentages and parts are by weight unless otherwise indicated.

COMPARATIVE EXAMPLE

The earth resistance-reducing effect was tested in a soil consisting of the ground surface, 10 cm. of a surface soil layer, 60 cm. of a fine sand layer, and 200 cm. of a gravel-sand layer in this order. The results obtained were as shown in the following tables. Table 1 shows the results of control tests, and Table 2 shows the results obtained according to this invention. A brief summary of the testing procedure is as follows: a copper-clad earth rod, 14 mm. in diameter and 1500 mm. in length, was driven into the central part of a hole, 0.8 x 0.8 x 1.0 (depth) m. in size. 100 liters of an aqueous solution of the compositions as shown in the following tables was poured into the hole, polymerized, cured, and thereafter the soil is replaced into the hole. The earth resistance was measured by means of an apparatus for measuring earth resistance under the condition that the distance between earth electrode and auxiliary electrode was 10 m., and the distance between two auxiliary electrodes was 10 m.

TABLE 1.—COMPOSITION OF CONTROL SAMPLES AND CHANGE OF RESISTANCE WITH LAPSE OF TIME

| Run No. | Composition of control sample of earth resistance-reducing agent [1] | Parts | Earth resistance [2] (ohm) | | | | |
| --- | --- | --- | --- | --- | --- | --- | --- |
| | | | Initial | After 4 months | After 8 months | After 1 year | After 2 years |
| 1 | Untreated | | 250 | 600 | 330 | 250 | 260 |
| 2 | Sodium chloride | 20 | 19 | 95 | 85 | 90 | 150 |
| | Magnesium chloride | 5 | | | | | |
| | Water | 75 | | | | | |
| 3 | Sodium silicate (41° Bé.) | 40 | 25 | 85 | 80 | 92 | 110 |
| | Concentrated hydrochloric acid | 4 | | | | | |
| | Copper sulfate | 1 | | | | | |
| | Water | 55 | | | | | |
| 4 | Acrylamide | 10 | 20 | 45 | 50 | 75 | 90 |
| | Diacrylamidomethylethyleneurea | 1 | | | | | |
| | Sodium chloride | 8 | | | | | |
| | Magnesium chloride | 2 | | | | | |
| | Water | 79 | | | | | |
| 5 | Acrylamide | 5 | 21 | 47 | 50 | 70 | 82 |
| | Diacrylamidomethylethyleneurea | 0.5 | | | | | |
| | Sodium chloride | 10 | | | | | |
| | Magnesium chloride | 2.5 | | | | | |
| | Water | 82 | | | | | |

[1] In Run Nos. 4 and 5, 0.6 part of dimethylaminopropionitrile and 0.5 part of ammonium persulfate were added to 100 parts of each composition.
[2] Months in which measurements were conducted were as follows: Initial, September; After 4 months, January; After 8 months, May.

TABLE 2.—COMPOSITION ACCORDING TO THIS INVENTION AND CHANGE OF RESISTANCE WITH LAPSE OF TIME

| Run No. | Composition of control sample of earth resistance-reducing agent [1] | Parts | Earth resistance [2] (ohm) | | | | |
|---|---|---|---|---|---|---|---|
| | | | Initial | After 4 months | After 8 months | After 1 year | After 2 years |
| 1 | Acrylamide | 7.5 | 20 | 30 | 25 | 24 | 26 |
| | Sodium acrylate | 0.5 | | | | | |
| | Methylenebisacrylamide | 1 | | | | | |
| | 2-hydroxyethyl methacrylate | 1 | | | | | |
| | Sodium chloride | 10 | | | | | |
| | Magnesium chloride | 2.5 | | | | | |
| | Water | 77.5 | | | | | |
| 2 | Acrylamide | 8 | 20 | 29 | 25 | 25 | 24 |
| | 1,3-Di(acrylamidomethyl)-2-imidazolidone | 1.4 | | | | | |
| | Ammonium acrylate | 0.6 | | | | | |
| | Ammonium methacrylate | 2 | | | | | |
| | Sodium chloride | 8 | | | | | |
| | Magnesium chloride | 2 | | | | | |
| | Water | 78 | | | | | |
| 3 | Acrylamide | 8 | 21 | 31 | 24 | 25 | 27 |
| | 1,3-Di(acrylamidomethyl)-2-imidazolidone | 3 | | | | | |
| | Sodium acrylate | 0.5 | | | | | |
| | Sodium methacrylate | 2 | | | | | |
| | Sodium chloride | 8 | | | | | |
| | Magnesium chloride | 2 | | | | | |
| | Water | 76.5 | | | | | |

[1] In Run Nos. 1, 2, and 3, 0.6 part of dimethylaminopropionitrile and 0.5 part of ammonium persulfate were added to 100 parts of each composition.
[2] Months in which measurements were made were as follows: Initial, September; After 4 months, January; After 8 months, May.

As is seen from Tables 1 and 2, the earth structure treated according to this invention showed substantially no run-off of the electrolytes due to rain water and inner water of the soil, and maintained the earth resistance-reducing effect for a long period.

The method according to this invention enables to keep the fluctuations of earth resistance due to seasonal change of climate in a very narrow range.

In the method of this invention the period of time before commencement of gelation can be easily controlled and the viscosity of an aqueous solution of the present reducing agent can be kept at a level as low as that of water until commencement of hardening, so that the application of said reducing agent by pouring is easy.

EXAMPLE 1

A solution (A) was prepared by adding 40 parts of water to a mixture of 0.6 part of dimethylaminopropionitrile and 10 parts of an earth resistance-reducing agent comprising 27.7% of acrylamide, 8.1% of sodium acrylate, 48.9% of sodium methacrylate, 10.2% of N,N'-methylenebisacrylamide and 5.1% of 2-hydroxyethylmethacrylate. A solution (B) was prepared by adding 50 parts of water to 0.5 part of ammonium persulfate. 20 liters of a mixture of equal parts of the solution A and solution B were poured around an earth rod, 14 mm. in diameter and 1500 mm. in length, placed upright at the central part of a hole, 3 cm. in diameter and 2 m. in depth, which had been excavated by means of an auger. By said treatment, the earth resistance was maintained at a favorable level, being 60 to 80 ohms after about one year. Since the earth resistance of the untreated soil was 800 ohms, the reduction ratio was one-tenth.

When the soil was treated merely with an aqueous salt solution, an excellent earth resistance of 20 ohms was obtained immediately after the treatment, but the resistance rose after one year to a value greater than 100 ohms.

EXAMPLE 2

A solution (A) was prepared by adding 40 parts of water to a mixture of 0.6 part of dimethylaminopropionitrile and 10 parts of an earth resistance-reducing agent comprising 21.4% of acrylamide, 3.1% of sodium acrylate, 60.2% of sodium methacrylate, 10.2% of N,N'-methylenebisacrylamide, and 5.1% of 2-hydroxyethyl methacrylate. A solution (B) was prepared by adding 50 parts of water to 0.5 part of ammonium persulfate. 20 liters of a mixture of equal parts of the solution A and solution B were poured into a hole of the inverted-cone shape, 75 cm. in depth, into the bottom of which an earth rod, 14 mm. in diameter and 1500 mm. in length, had been driven. After 5 minutes, during which period 15 liters of the said premixed solution had been infiltrated into the ground, the soil was replaced into the hole.

By the above-mentioned reducing treatment, the earth resistance has been maintained at 75 to 95 ohms after one year. Since the earth resistance of the untreated soil was 800 ohms, the reduction ratio was 0.12, a value which is quite favorable.

EXAMPLE 3

A solution (A) was prepared by adding 0.6 part of dimethylaminopropionitrile and 10 parts of an earth resistance-reducing agent comprising 81.6% of acrylamide, 3.1% of sodium acrylate, 10.2% of N,N'-methylenebisacrylamide, and 5.1% of 2-hydroxyethyl methacrylate, to 50 parts of an aqueous solution containing 20% of sodium chloride. A solution (B) was prepared by adding 0.5 part of ammonium persulfate to 50 parts of an aqueous solution containing 20% of sodium chloride. 100 liters of a mixture of equal parts of the solution A and solution B were poured around an earth rod, 14 mm. in diameter and 1500 mm. in length, placed upright at the center of the hole, 20 cm. in diameter and 2.5 m. in depth, which had been excavated by means of an auger. After 30 seconds, a homogel having the electrolyte dissolved therein was formed around the earth rod. A lead wire was extended from the earth rod to the outside of the hole, and the gel was covered with the replaced soil.

The earth resistance was 20 ohms immediately after the treatment, and 25 ohms after 2 years, showing substantially no deterioration.

As has been shown in the Comparative Example, when treated with an earth resistance-reducing agent containing neither sodium acrylate nor 2-hydroxyethyl methacrylate, the earth resistance was 20 ohms immediately after the treatment, but has risen to 80–90 ohms after 2 years.

EXAMPLE 4

A solution (A) was prepared by adding 1.0 part of sodium thiosulfate and 10 parts of an earth resistance-reducing agent comprising 2.5% acrylamide, 1.6% of ammonium acrylate, 23.4% of 1,3-di(methacrylamidomethyl)-2-imidazolidone, and 12.5% of magnesium methacrylate, to 50 parts of an aqueous solution containing 20% of sodium chloride. A solution (B) was prepared by adding 1.0 part of potassium persulfate to 50 parts of an aqueous solution containing 20% of sodium chloride. 100 liters of a mixture of equal parts of the solution A and solution B were poured together with soil into a hole, 0.8 m. in diameter and 1.5 m. in depth, into the bottom of which an earth rod had been driven, and allowed to solidify. The earth resistance was 21 ohms immediately after the treatment, and about 27 to 28 ohms after 2 years.

EXAMPLE 5

A solution (A) was prepared by adding 0.4 part of dimethylaminopropionitrile and 0.2 part of sodium thiocyanate to 50 parts of an aqueous solution containing 7% of acrylamide, 0.4% of sodium acrylate, 4% of sodium methacrylate, 0.4% of 2-hydroxyethyl methacrylate, and 1% of 1,3-di(acrylamidomethyl)-2-imidazolidone. A solution (B) was prepared by mixing 0.5 part of ammonium persulfate, 15 parts of ammonium sulfate, and 34 parts of water. In a mixture of the solution A and solution B, was suspended a copper specimen (30 x 50 x 2 mm.) which had been polished with an emery paper, washed, degreased, and dried. The said mixed solution was allowed to form a gel and left standing at room temperature for 2 weeks. Then the specimen was taken out of the gel and the degree of corrosion inhibition was measured by comparison with the case where no sodium thiocyanate was added. The degree of corrosion inhibition was calculated by the following equation:

Degree of corrosion inhibition (percent)

$$= \frac{\text{Weight decrease in the absence of inhibitor} - \text{Weight decrease in the presence of inhibitor}}{\text{Weight decrease in the absence of inhibitor}} \times 100$$

The results obtained were as shown in Table 3, wherein the gel time is also shown.

On the other hand, using the reducing agent having the above-said composition, the earth resistance was measured in both cases where sodium thiocyanate was added and not added. A hole of 50 cm. in diameter and 75 cm. in depth, was dug in a soil composed of, the ground surface, 20 cm. of a surface soil layer, 60 cm. of a fine sand layer, and 200 cm. of a sand-gravel layer in this order. A copper-clad rod, 10 mm. in diameter and 1500 mm. in length, was driven into the center of the hole. 20 liters of the solution of said reducing agent were poured together with sand and soil into the hole, and allowed to gel. Measurements of the earth resistance was conducted using a measuring instrument for the ground resistivity under the condition that the distance between earth electrode and auxiliary electrode was 10 cm., and the distance between two auxiliary electrodes was 10 m. The results of the measurement were as shown in Table 3.

TABLE 3

| Corrosion inhibitor | Degree of corrosion inhibition (percent) | Gel time Minutes | Gel time Seconds | Earth resistance (ohm) |
|---|---|---|---|---|
| None | 0 (standard) | 4 | 52 | 23 |
| Sodium thiocyanate | 100 | 4 | 23 | 22 |

NOTE.—Since the degree of corrosion inhibition is calculated on the basis of the standard case where no corrosion inhibitor is used, the degree of corrosion inhibition in the standard case is 0 in theory.

It is seen from the results shown in Table 3 that sodium thiocyanate has substantially no effect upon the gel time, and can exhibit an excellent corrosion inhibiting effect on copper when added in quite small amounts (0.1% of the total amount of the solution). Further, the addition of sodium thiocyanate has substantially no effect on the earth resistance.

Another experiment was performed concerning the stability of sodium thiocyanate at high temperatures. One part of sodium thiocyanate was dissolved in 50 parts of the solution of reducing agent, said solution being of the above-mentioned composition, and the resulting solution was kept at 50 to 55° C. Gelation was conducted after 1, 2, and 3 weeks. Copper specimens, which had been kept in each gel at room temperature for 2 weeks, were tested for the degree of corrosion inhibition. The results obtained were as shown in Table 4.

TABLE 4

| Period of storage at 50-55° C. (week) | Degree of corrosion inhibition (percent) | Gel time Minutes | Gel time Seconds |
|---|---|---|---|
| 1 | 100 | 4 | 23 |
| 2 | 100 | 4 | 23 |
| 3 | 100 | 4 | 35 |

It is seen from the results in Table 4 that after having been stored at a high temperature for a long period of time, sodium thiocyanate undergoes no change in its effect on the degree of corrosion inhibition and gelation behavior, and, therefore, is sufficiently stable for the practical use.

EXAMPLE 6

A solution (A) was prepared by adding 0.4 part of dimethylaminopropionitrile and 0.1 part of a thiocyanate shown in Table 5 to 50 parts of an aqueous solution containing 9.5% of acrylamide, 0.5% of N,N'-methylenebisacrylamide, 1% of ammonium methacrylate, and 0.5% of sodium acrylate. A solution (B) was prepared by mixing 0.5 part of ammonium persulfate, 15 parts of ammonium sulfate, and 34 parts of water. In a mixture of the solutions A and B, was suspended a copper specimen which had been treated in the same manner as in Example 5, and the mixture was allowed to gel. After having been left standing at room temperature for 2 weeks, the copper specimens kept in each gel were tested for the degree of corrosion inhibition. The results obtained were as shown in Table 5.

TABLE 5

| Corrosion inhibitor | Degree of corrosion inhibition (percent) | Gel time Minutes | Gel time Seconds |
|---|---|---|---|
| None | 0 (standard) | 2 | 50 |
| Ammonium thiocyanate | 99.5 | 2 | 46 |
| Sodium thiocyanate | 100 | 2 | 46 |
| Potassium thiocyanate | 100 | 2 | 53 |

It is seen from the results shown in Table 5 that salts of thiocyanic acid have an excellent corrosion inhibiting effect and do not affect the gelation at all.

EXAMPLE 7

A solution (A) was prepared by adding 0.4 part of dimethylaminopropionitrile and 0.1 part of sodium thiocyanate to 50 parts of an aqueous solution containing 9% of acrylamide, 0.6% of ammonium acrylate, 2% of sodium methacrylate, 0.4% of 2-hydroxyethyl methacrylate, and 1% of 1,3-di(acrylamidomethyl)-2-imidazolidone. A solution (B) was prepared by mixing 0.5 part of ammonium persulfate, 10% of sodium chloride, and 39 parts of water. In a mixture of the solutions A and B, was suspended a copper specimen treated preliminarily in the same manner as in Example 5, and the mixed solution was allowed to gel. After having been left standing at room temperature for 2 weeks, the copper specimen was taken out from the gel and tested for the degree of corrosion inhibition. The results obtained were as shown in Table 6, in which was also shown the gel time.

TABLE 6

| Corrosion inhibitor | Degree of corrosion inhibition (percent) | Gel time Minutes | Gel time Seconds |
|---|---|---|---|
| None | 0 (standard) | 4 | 32 |
| Sodium thiocyanate | 100 | 4 | 25 |

It is seen from the above-mentioned results that sodium thiocyanate has an excellent anticorrosive effect on copper in the presence of sodium chloride as an electrolyte as well as in the presence of ammonium sulfate, and that sodium thiocyanate does not affect the gelation behavior to such an extent that any practical trouble may result.

It is also seen that the corrosion inhibiting effect is not affected by the change in composition of the reducing agent.

The same result was obtained whether sodium chloride is added to the solution A or to the solution B, that is to say that the electrolyte can be added to A and/or B.

REFERENCE EXAMPLE 1

A series of experiments were carried out concerning the influences of a number of known corrosion inhibitors for copper when these inhibitors were applied to the method of this invention.

To 100 parts of the reducing agent solution having the same composition as in Example 7, was added 0.3% of a corrosion inhibitor shown in Table 7. A copper specimen was suspended in the resulting mixture, and the mixture was heated at 40° C. After having been left standing for 48 hours, the copper specimen was taken out and tested for the degree of corrosion inhibition. The results obtained were as shown in Table 7.

TABLE 7

| Corrosion inhibitor: | Degree of corrosion inhibition (in solution of reducing agent) (percent) |
|---|---|
| Hexamethylenetetramine | 100 |
| Mercaptobenzotriazole | 100 |
| 2-mercaptoethanol | 100 |
| Thioglycolic acid | 94.8 |
| Potassium ferrocyanate | 100 |
| o-Phenylenediamine | 99.5 |
| Sodium bichromate | 70.6 |
| Mercaptobenzimidazole | 95.4 |
| Mercaptoethanol | 100 |
| 1-phenyl-2-thiourea | 72.2 |
| Laurylmercaptan | 89.4 |
| $\beta$-Mercaptopropionic acid | 92.4 |

Other known corrosion inhibitors, not shown in Table 7, were found to have a degree of corrosion inhibition of less than 70%. These inhibitors include $\alpha$-naphthylamine, 1,3-diethylurea, o-toluidine, quinoline, benzylamine, hexamethylenediamine, diethylenetriamine, triethanolamine, morpholine, pyrrole, etc.

From the results shown in Table 7, it is seen that a considerably wide range of compounds exhibit a pronounced anticorrosive effect. However, these corrosion inhibitors have such defects that when added to the reducing agents they prevent curing of the reducing agents, or if the curing is not prevented, the anticorrosive effect of said compounds in the resulting gel is hardly recognizable.

In the same manner as in Example 7, gels were prepared after addition of 0.3 part of each corrosion inhibitors shown in Table 8. Copper specimens, which had been suspended in the resulting gels and left standing at room temperature for 2 weeks, were tested for anticorrosive effect. The results obtained and the gelation time were as shown in Table 8.

TABLE 8

| Corrosion inhibitor | Degree of corrosion inhibition (percent) | Gel time Minutes | Seconds |
|---|---|---|---|
| Hexamethylenetetramine | 39.8 | 5 | 46 |
| Mercaptobenzotriazole | Negative | 8 | 41 |
| 2-mercaptoethanol | 43.6 | 6 | 24 |
| Thioglycolic acid | Negative | 8 | 16 |
| Potassium ferrocyanate | | No gel | |
| Sodium bichromate | | No gel | |
| o-Phenylenediamine | | No gel | |
| Mercaptoethanol | 43.6 | 6 | 24 |
| 1-phenyl-2-thiourea | 70 | 23 | 30 |
| $\beta$-Mercaptopropionic acid | | No gel | |

NOTE.—The term "negative," as used in the table, means that by the addition of a corrosion inhibitor the corrosion has been accelerated.

From Table 8, it is seen that some compounds, which show a pronounced anticorrosive effect in the aqueous solution of the reducing agent, lose anticorrosive effect to a marked extent in the gel, or even change into corrosion accelerators (mercaptobenzotriazole, thioglycolic acid, etc.). On the other hand, it is seen that such compounds as potassium ferrocyanate, sodium bichromate, o-phenylenediamine, $\beta$-mercaptopropionic acid, etc., interfere with gelation of the reducing agent, and therefore, are corrosion inhibitors of no practical utility. Mercaptobenzimidazole and lauryl mercaptan, not shown in Table 8, exhibit a relatively favorable anticorrosive effect. However these compounds cannot be used in practice, because they are insoluble and difficultly dispersible in water and adversely affect uniform gelation, bringing about difficulty in maintaining a long-lasting effect of the earth resistance-reducing agent. Moreover, these compounds have a strong odor which deteriorates operation environment.

REFERENCE EXAMPLE 2 o-Phenylenediamine used in Reference Example 1 showed an excellent degree of corrosion inhibition of 99.5% in an aqueous solution of the earth resistance-reducing agent. However, attempts to bring about gelation of the said reducing agent containing o-phenylenediamine by use of a redox catalyst were failed. The amount of redox catalyst were increased up to 8 times o-phenylenediamine by mole, as shown in Table 9, to obtain only negative results. As a result, it may be concluded that in the case where there are added a corrosion inhibitor which interferes with gelation of an aqueous solution of the reducing agent, the increase in the amount of a redox catalyst is ineffective. Thus the corrosion inhibitor which interferes with the gelation cannot be used in practice.

TABLE 9

| Dimethyl-aminopropionitrile (part) | Ammonium persulfate (part) | Ammonium persulfate (mole), o-phenylenediamine (mole) |
|---|---|---|
| 0.8 | 1.0 | 1.6 |
| 1.2 | 1.5 | 2.4 |
| 1.4 | 1.8 | 2.8 |
| 2.1 | 2.6 | 4.1 |
| 2.6 | 3.2 | 5.0 |
| 3.0 | 3.8 | 6.0 |
| 3.5 | 4.4 | 6.9 |
| 4.1 | 5.1 | 8.0 |

EXAMPLE 8

A solution (A) was prepared by adding 0.4 part of dimethylaminopropionitrile and 0.1 part of benzotriazole to 50 parts of an aqueous solution containing 8% of acrylamide, 0.4% of sodium acrylate, 3% of sodium methacrylate, 0.4% of 2-hydroxyethyl methacrylate, and 1% of 1,3-di(acrylamidomethyl)-2-imidazolidone. A solution (B) was prepared by mixing 0.5 part of ammonium persulfate 15 parts of ammonium sulfate, and 34 parts of water. In a mixture of the solutions A and B, was suspended a copper specimen (30 x 50 x 2 mm.) which had been polished with an emery paper, washed, degreased, and dried. The said mixture of solutions was allowed to gel and left standing at room temperature for 2 weeks. Then the specimen was taken out and the degree of corrosion inhibition was measured by comparison with the case where no benzotriazole was added. The results obtained were as shown in Table 10, in which were also shown gel times.

On the other hand, using the reducing agent having the above-mentioned composition, the earth resistance was measured in both cases where benzotriazole was added and not added.

A hole, 50 cm. in diameter and 75 cm. in depth, was dug in a soil composed of, in sequence from the ground surface, 20 cm. of surface soil layer, 60 cm. of fine sand layer, and 200 cm. of sand-gravel layer. A copper-clad earth rod, 10 mm. in diameter and 1500 mm. in length, was driven into the center of the hole. 20 liters of said aqueous solution of the reducing agent were poured together with sand and soil into the hole, and allowed to gel. Measurement of the earth resistance was conducted by means of a measuring instrument for the ground resistivity under the condition that the distance between earth electrode and auxiliary electrode was 10 m., and the distance between two auxiliary electrodes was 10 m. The results obtained were as shown in Table 10.

TABLE 10

| Corrosion inhibitor | Degree of corrosion inhibition (percent) | Gel time Minutes | Gel time Seconds | Earth resistance (ohm) |
|---|---|---|---|---|
| None | 0 (standard) | 3 | 50 | 25 |
| Benzotriazole | 99.5 | 4 | 10 | 25 |

It is seen from the results shown in Table 10 that benzotriazole has no substantial effect upon the gel time, and can exhibit and excellent anticorrosive effect on copper. Further, the addition of benzotriazole has no substantial effect on the earth resistance.

Another experiment was performed concerning the stability of benzotriazole at high temperatures. One part of benzotriazole was dissolved in 50 parts of the aqueous solution of the reducing agent, said solution being of the above-mentioned composition, and the resulting solution was kept at 50 to 55° C. Gelation was initiated after 1 and 2 weeks in the same manner as mentioned above. Copper specimens, which had been kept in each gel at room temperature for 2 weeks, were taken out of the gel and tested for the degree of corrosion inhibition. The results obtained were as shown in Table 11.

TABLE 11

| Period of storage at 50-55° C. (week) | Degree of corrosion inhibition (percent) | Gel time Minutes | Gel time Seconds |
|---|---|---|---|
| 1 | 98.9 | 4 | 13 |
| 2 | 93.4 | 4 | 20 |

It is seen from the results in Table 11 that after having been stored at a high temperature for a long period of time, benzotriazole undergoes no substantial change in its effect on the degree of corrosion inhibition and gelation behavior, and is fairly stable in practice.

EXAMPLE 9

A solution (A) was prepared by adding 0.4 part of dimethylaminopropionitrile and 0.03 part of a benzotriazole derivative shown in Table 12 to 50 parts of an aqueous solution containing 7% of acrylamide, 0.5% of N,N'-methylenebisacrylamide, 3% of sodium methacrylate, and 1% of sodium acrylate. A solution (B) was prepared by mixing 0.5 part of ammonium persulfate, 15 parts of ammonium sulfate, and 34 parts of water. In a mixture of the solutions A and B, was suspended a copper specimen which had been treated in the same manner as in Example 8. The said mixture of solutions was allowed to gel and left standing at room temperature for 2 weeks. The degree of corrosion inhibition was then measured on the copper thus stored in the gel. The results obtained were as shown in Table 12.

TABLE 12

| Corrosion inhibitor | Degree of corrosion inhibition (percent) | Gel time Minutes | Gel time Seconds |
|---|---|---|---|
| None | 0 (standard) | 2 | 50 |
| 5-nitrobenzotriazole | 94.7 | 13 | 54 |
| 6-nitrobenzotriazole | 99.0 | 12 | 13 |
| 5-chlorobenzotriazole | 88.2 | 4 | 25 |
| 6-chlorobenzotriazole | 84.6 | 4 | 52 |
| 5-methylbenzotriazole | 90.0 | 5 | 01 |

From the results shown in Table 12, it is seen that benzotriazole derivatives having a certain substituent exhibit an anticorrosive effect as excellent as benzotriazole. Some of the derivatives tend to prolong the gel time, but gel times as shown in Table 12 are quite tolerable in practice for the chemical treatment or surroundings of the earth electrode.

EXAMPLE 10

A solution (A) was prepared by adding 0.4 part of dimethylaminopropionitrile and 0.1 part of 5-methylbenzotriazole to 50 parts of an aqueous solution containing 9% of acrylamide, 0.4% of sodium acrylate, 1% of sodium methacrylate, 0.4% of 2-hydroxyethyl methacrylate, and 1% of 1,3-di(acrylamidomethyl)-2-imidazolidone. A solution (B) was prepared by mixing 0.5 part of ammonium persulfate, 10 parts of sodium chloride, and 39 parts of water. In a mixture of the solutions A and B was suspended a copper specimen which had been treated in the same manner as in Example 8. The said mixture of solutions was allowed to gel and then to stand at room temperature for 2 weeks. Then the copper specimen was taken out and tested for the degree of corrosion inhibition. The results obtained were as shown in Table 13, in which the gel time was also shown.

TABLE 13

| Corrosion inhibitor | Degree of corrosion inhibition (percent) | Gel time Minutes | Gel time Seconds |
|---|---|---|---|
| None | 0 (standard) | 3 | 35 |
| 5-methylbenzotriazole | 90.0 | 6 | 20 |

It is seen from the above-mentioned results that 5-methylbenzotriazole has an excellent anticorrosive effect on copper in the presence of sodium chloride as an electrolyte as well as in the presence of ammonium sulfate, and that 5-methylbenzothiazole does not affect the gelation behavior to such an extent that any practical trouble may result.

The same result was obtained whether sodium chloride is added to the solution A or to the solution B; that is, the electrolyte can be added to A and/or B.

EXAMPLE 11

Gelation was conducted in the same manner as in Example 10, except that benzotriazole and ammonia sulfate were used as the corrosion inhibitor and electrolyte respectively. The gel time was 3 minutes and 50 seconds, and the degree of corrosion inhibition was 99.6%. By comparing these results with those of Example 8, it is seen that the degree of of corrosion inhibition is not substantially affected by the change in composition of the earth resistance-reducing agent of the acrylamide type.

What is claimed is:

1. An aqueous solution of an acrylamide type earth resistance-reducing agent comprising (1) acrylamide, (2) 0.1 to 100% by weight, based on the weight of the acrylamide, of a water-soluble cross-linking monomer selected from the group consisting of N,N'-methylene-bisacrylamide, N,N'-methylenebismethacrylamide, 1,3-di(acrylamidomethyl)-2-imidazolidone, 1,3 - di(methacrylamidomethyl) - 2 - imidazolidone, diacrylamidomethylethyleneurea, diacrylamidodimethyl ether, hexahydro-1,3,5-triacyl-s-triazine and polyvanlent metal salts of acrylic acid, (3) 1 to 100% by weight, based on the weight of the acrylamide, of sodium acrylate, ammonium acrylate, or a mixture of these compounds, and (4) 1 to 500% by weight, based on the weight of the acrylamide, of at least one compound selected from the group consisting of water-soluble metal salts of methacrylic acid, ammonium methacrylate, and 2-hydroxyethyl methacrylate.

2. An aqueous solution according to claim 1, which further contains 0.001 to 10% by weight, based on the weight of the earth resistance-reducing agent, of at least one compound selected from the group consisting of water-soluble thiocyanates, benzotriazole, and hydroxy-, chloro-, lower alkyl- or nitro-substituted derivatives of benzothiazole.

3. An aqueous solution according to claim 2, which further contains a water soluble inorganic electrolyte.

4. An aqueous solution according to claim 1, which further contains a water soluble inorganic electrolyte.

5. An aqueous solution according to claim 4, wherein the inorganic electrolyte is sodium chloride, ammonium sulfate, or a mixture of these compounds.

6. An aqueous solution according to claim 3, wherein the inorganic electrolyte is sodium chloride, ammonium sulfate, or a mixture of these compounds.

7. An aqueous solution according to claim 1, wherein the water-soluble cross-linking monomer is N,N'-methylenebisacrylamide.

8. An aqueous solution according to claim 1, wherein the water-soluble crosslinking monomer is 1,3-di(acrylamidomethyl)-2-imidazolidone.

9. An aqueous solution according to claim 1, wherein the metal salt of methacrylic acid is sodium methacrylate or magnesium methacrylate.

10. An aqueous solution according to claim 2, wherein the compound is sodium thiocyanate, potassium thiocyanate, ammonium thiocyanate, benzotriazole, 5-nitrobenzotriazole, 6-nitrobenzotriazole, 5-chlorobenzotriazole, 6-chlorobenzotriazole, or 5-methylbenzotriazole.

11. An aqueous solution according to claim 1 wherein the aqueous solution contains 1 to 30% by weight of acrylamide.

12. A method for reducing the earth resistance which comprises pouring or injecting into the soil surrounding an earth electrode an aqueous solution containing (1) acrylamide, (2) 0.1 to 100% by weight, based on the weight of the acrylamide, of a water-soluble cross-linking monomers selected from the group consisting of N, N'-methylenebisacrylamide, N,N'-methylenebismethacrylamide, 1,3 - di(acrylamidomethyl)-2-imidazolidone, 1,3-di(methacrylamidomethyl) - 2 - imidazolidone, diacrylamidomethylethylene urea, diacrylamidodimethyl ether, hexahydro - 1,3,5-triacyl-s-triazine and polyvalent metal salts of acrylic acid, (3) 1 to 100% by weight, based on the weight of the acrylamide, of sodium acrylate, ammonium acrylate, or a mixture of these compounds, and (4) 1 to 500% by weight, based on the weight of the acrylamide of at least one compound selected from the group consisting of metal salts of methacrylic acid, ammonium methacrylate, and 2-hydroxyethyl methacrylate, together with a water-soluble redox catalyst.

13. A method according to claim 12, wherein the aqueous solution further contains at least one compound selected from the group consisting of water-soluble thiocyanates, benzotriazole, and hydroxy-, halogen-, alkyl-, or nitro-substituted derivatives of benzotriazole.

14. A method according to claim 12, wherein the aqueous solution further contains a water-soluble inorganic electrolyte.

15. A method according to claim 13, wherein the aqueous solution further contains a water-soluble inorganic electrolyte.

16. A method according to claim 12, wherein in the aqueous solution at the time of application, the concentration of the acrylamide is about 1 to 30% by weight, the concentration of the water-soluble crosslinking monomer is about 0.05 to 5% by weight, the concentration of the sodium acrylate, ammonium acrylate, or mixture of these compounds is about 0.05 to 30% by weight, and the concentration of at least one compound selected from the group consisting of metal salts of methacrylic acid, ammonium methacrylate, and 2-hydroxyethyl methacrylate is about 0.05 to 30% by weight.

17. A method according to claim 13, wherein in the aqueous solution at the time of application, the concentration of the acrylamide is about 1 to 30% by weight, the concentration of the water-soluble crosslinking monomer is about 0.05 to 5% by weight, the concentration of the sodium acrylate, ammonium acrylate, or mixture of these compounds is about 0.05 to 30% by weight, the concentration of at least one compound selected from the group consisting of metal salts of methacrylic acid, ammonium methacrylate, and 2-hydroxyethyl methacrylate is about 0.05 to 30% by weight, and the concentration of at least one compound seelcted from the group consisting of water-soluble thiocyanates, benzotriazole, and hydroxy-, chloro-, lower alkyl- or nitro-substituted derivatives of benzotriazole is about 0.001 to 10% by weight.

18. A method according to claim 14, wherein in the aqueous solution at the time of application, the concentration of the acrylamide is about 1 to 30% by weight, the concentration of the water-soluble crosslinking monomer is about 0.05 to 5% by weight, the concentration of the sodium acrylate, ammonium acrylate, or mixture of these compounds is about 0.05 to 30% by weight, the concentration of at least one compound selected from the group consisting of metal salts of methacrylic acid, ammonium methacrylate, and 2-hydroxyethyl methacrylate is about 0.05 to 30% by weight, and the concentration of the inorganic electrolyte is from about 0.5% by weight up to saturation.

19. A method according to claim 15, wherein the aqueous solution at the time of application, the concentration of the acrylamide is about 1 to 30% by weight, the concentration of the water-soluble crosslinking monomer is about 0.05 to 5% by weight, the concentration of the sodium acrylate, ammonium acrylate, or mixture of these compounds is about 0.05 to 30% by weight, the concentration of at least one compound selected from the group consisting of metal salts of methacrylic acid, ammonium methacrylate, and 2-hydroxyethyl methacrylate is about 0.05 to 30% by weight, the concentration of at least one compound selected from the group consisting of water-soluble thiocyanates, benzotriazole, and hydroxy-, chloro-, lower alkyl-, or nitro-substituted derivatives is 0.001 to 10% by weight, and the concentration of the inorganic electrolyte is from about 0.5% by weight up to saturation.

References Cited

UNITED STATES PATENTS

| | | | |
|---|---|---|---|
| 2,558,159 | 6/1951 | Samick | 174—6 |
| 3,029,302 | 4/1962 | Ledoux | 174—6 |
| 3,323,980 | 6/1967 | Poschmann et al. | 260—80.72 |
| 3,580,879 | 5/1971 | Higashimura et al. | 260—80.73 |

CHARLES E. VAN HORN, Primary Examiner

U.S. Cl. X.R.

252—518, 500; 117—201, 222, 223; 260—80.72, 80.73